United States Patent Office 2,954,375
Patented Sept. 27, 1960

2,954,375

12α-HYDROXY-12β-METHYLTIGOGENIN AND 12-METHYLENE STEROIDS DERIVED THEREFROM

Luis E. Miramontes and Miguel A. Romero, Mexico City, Mexico, assignors to G. D. Searle & Co., Chicago, Ill., a corporation of Delaware No Drawing. Filed Sept. 30, 1959, Ser. No. 843,375

6 Claims. (Cl. 260—239.55)

The present invention relates to a new group of 12-methyl steroids and, more particularly to 12α-hydroxy-12β-methyltigogenin, a compound which can also be named as a 3β,12α-dihydroxy-12β-methyl-5α,22α-spirostan and which has the structural formula

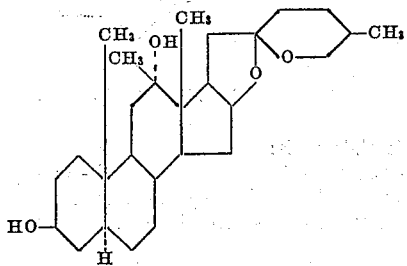

This compound is an extremely valuable intermediate for the preparation of 12-methylene steroids.

The compound shown above is conveniently prepared from such readily available starting materials as hecogenin and its esters. An ester of hecogenin is treated with a methylmagnesium halide under Grignard conditions, typically in an aromatic hydrocarbon solvent such as benzene, toluene or xylene. The 12α-hydroxy-12β-methyltigogenin thus produced is conveniently converted to the 3-monoester by treatment with the appropriate alkanoic anhydride and pyridine.

Pseudomerization of 12α-hydroxy-12β-methyltigogenin or its ester by heating with acetic anhydride at a temperature in the range of about 190° yields the 3β-acyloxy-12-methylene-5α-furostan-20(22)-ene which on treatment with chromium trioxide in acetic acid is converted to the 3 - acyloxy-12-methylene-16-(γ-methyl-δ-acetoxypentanoyloxy)-5α-pregnan-20-one. Some difficulty is encountered in splitting of the 16-side chain when using such mild conditions as refluxing in aqueous acetic acid or treatment with alkaline aqueous acetone at room temperature. The reaction can be carried out by heating with aqueous alkaline acetone. However, it is preferred to carry out cleavage with alumina. For example, the 16-(γ-methyl-δ-acetoxypentanoyloxy) derivative can be adsorbed on alumina and elution with a 1:1 mixture of benzene and hexane then yields the 3β-acyloxy-12-methylene-5α-pregn-16-en-20-one; the unsplit ester is recovered from the column on elution with more polar solvents. Treatment with alkaline hydrogen peroxide yields 3β-hydroxy-12-methylene 16α,17α-epoxypregnan-20-one. This alcohol, its 3-monoesters and the corresponding oxo compound derived therefrom by oxidation with chromic acid have a surprising physiological activity in that they are able to antagonize the sodium retention produced by aldosterone.

The 3β - acyloxy-12-methylene-5α-pregn-16-en-20-ones can be hydrogenated by use of palladium catalyst to yield the 3β-acyloxy-12-methylene-5α-pregnan-20-one using a catalyst such as palladium. These esters are likewise antagonists of aldosterone.

This invention will appear in further detail from the details set forth in the examples but is not to be construed as limited thereby in scope. It will be apparent to those skilled in the art that numerous modifications of materials and methods can be adopted without departing from the invention. In these examples quantities are given in parts by weight.

*Example 1*

A solution of 110 parts of 3-molar methyl magnesium bromide in benzene is added slowly with stirring to a solution of 20 parts of anhydrous hecogenin acetate. The mixture is then refluxed for 8 hours. The excess Grignard reagent is destroyed by carefully adding cold water at low temperature. Then a mixture of 50 parts of hydrochloric acid and 50 parts of water is added. The solution is heated slightly to dissolve the precipitate and the organic layer is separated, washed with water to neutrality, dried over anhydrous sodium sulfate, filtered, and evaporated to dryness. The residue is taken up in ethanol and a small amount of water is added to induce the crystallization of 3β,12α - dihydroxy - 12β - methyl-5α,22α-spirostan (12α-hydroxy-12β-methyltigogenin) which is recovered by filtration and recrystallized from aqueous ethanol. The compound melts at about 205–206° C. and has the specific rotation of about —40°.

*Example 2*

10 parts of 3β,12α - dihydroxy - 12β - methyl-5α,22α-spirostan is heated with 20 parts of acetic anhydride in pyridine solution for 1 hour to yield 3β-acetoxy-12α-hydroxy-12β-methyl-5α,22α-spirostan (12α-hydroxy-12β-methyltigogenin acetate) melting at about 228–229° C. The specific rotation is about —42.8°.

*Example 3*

A mixture of 25 parts of 3β,12α-dihydroxy-12β-methyl-5α,22α-spirostan and 100 parts of acetic anhydride is heated for 6 hours at a temperature of 190° C. The mixture is then diluted with 100 parts of acetic acid and 23 parts of water and agitated for 30 minutes at a temperature of 40° C. After cooling to about 0° C. 125 parts of 1,2-dichloroethane are added. In the course of 90 minutes a solution of 10.5 parts of chromic oxide in 16.5 parts of water and 10.5 parts of acetic acid is added to the reaction mixture with stirring at a temperature of about 5–11° C. When the addition is completed, the solution is heated to room temperature and stirring is continued for 1 hour. Water is added and the organic layer is separated and washed with water. The aqueous layer is extracted with 1,2-dichloroethane. The extracts are washed with water and combined with the organic layer. This solution is boiled with activated charcoal, filtered, and cooled to yield crude 3β-acetoxy-12-methylene - 16 - (γ-methyl-δ-acetoxypentanoyloxy)-5α-pregnan-20-one which begins to melt at about 113° C. The specific rotation is about +50°. The product has the structural formula

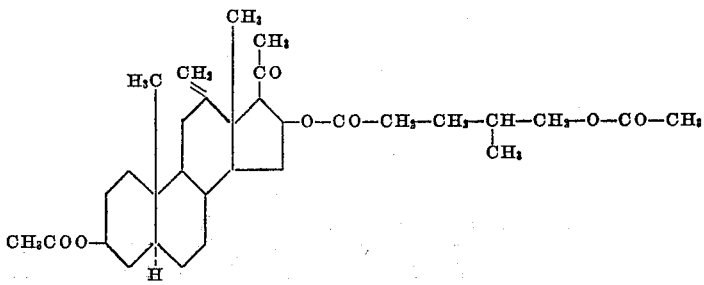

Example 4

A solution of 3β-acetoxy-12-methylene-16-(γ-methyl-δ-acetoxypentanoyloxy)-5α-pregnan-20-one in a 1:1 mixture of benzene and hexane is chromatographed over alumina. There is thus obtained 3β-acetoxy-12-methylene-5α-pregn-16-en-20-one melting at about 153–154° C. The specific rotation is about +190°. The compound has the structural formula

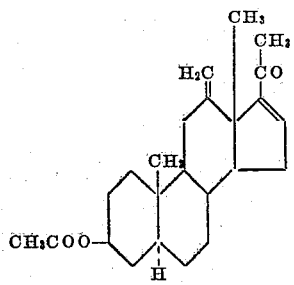

Example 5

A solution of 1 part of 3β-acetoxy-12-methylene-5α-pregnan-16-en-20-one in 8 parts of chloroform is mixed with 8 parts of methanol, 2 parts of 25% hydrogen peroxide and 0.26 part of sodium hydroxide in 1.25 parts of water. The reaction mixture is allowed to stand for 24 hours at room temperature. Acetic acid is added to neutralize the alkali and water is added to induce precipitation. The precipitate is recovered by filtration and dissolved in chloroform. The solution is evaporated and the residue is recrystallized from a mixture of chloroform and methanol to yield 3β-hydroxy-12-methylene-16α,17α-epoxy-5α-pregnan-20-one melting at about 92–94° C. The specific rotation is about +105°.

Example 6

A mixture of 10 parts of 3β-hydroxy-12-methylene-16α,17α-epoxy-5α-pregnan-20-one is heated with 20 parts of acetic anhydride in pyridine solution for about 1 hour to yield 3β-acetoxy-12-methylene-16α,17α-epoxy-5α-pregnan-20-one melting at about 206–208° C. The specific rotation is about +90°.

Example 7

To a solution of 6.45 parts of 3β-hydroxy-12-methylene-16α,17α-epoxy-5α-pregnan-20-one and 160 parts of acetone are added with stirring and cooling 26.7 parts of chromic oxide, 42 parts of concentrated sulfuric acid, and 30 parts of water. Stirring is continued for 5 minutes and water is added to precipitate the product which is collected by filtration and recrystallized from a mixture of chloroform and methanol. 12-methylene-16α,17α-epoxy-5α-pregnane-3,20-dione thus obtained melts at about 164–166° C. and has the specific rotation of about +138°.

Example 8

A solution of 2 parts of 3β-acetoxy-12-methylene-5α-pregn-16-en-20-one in 23 parts of ethyl acetate is hydrogenated over 0.075 part of a 5% palladium on barium sulfate catalyst. The solution is chromatographed on alumina and the product is recrystallized from a mixture of chloroform and methanol to yield 3β-acetoxy-12-methylene-5α-pregnan-20-one melting at about 97–98° C. The specific rotation is about +54°. The compound has the structural formula

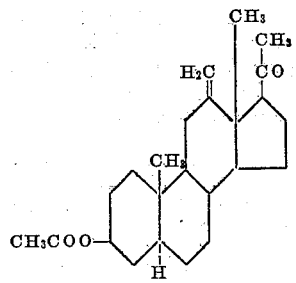

What is claimed is:

1. 3β - acetoxy - 12 - methylene - 16 - (γ - methyl - δ-acetoxypentanoyloxy)-5α-pregnan-20-one.

2. 3β - acetoxy - 12 - methylene - 5α - pregn - 16 - en-20-one.

3. A compound of the structural formula

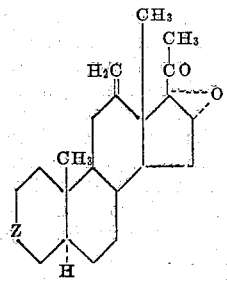

wherein Z is a member of the class consisting of β-hydroxy-methylene, β-acetoxymethylene and the carbonyl radical.

4. 3β - hydroxy - 12 - methylene - 16α,17α - epoxy-5α-pregnan-20-one.

5. 12 - methylen - 16α,17α - epoxy - 5α - pregnane-3,20-dione.

6. 3β-acetoxy-12-methylene-5α-pregnan-20-one.

References Cited in the file of this patent

Elks et al. 49 Chem. Abst., 9685–87 (1955).